(12) United States Patent
Kubis et al.

(10) Patent No.: US 11,768,981 B2
(45) Date of Patent: Sep. 26, 2023

(54) SYSTEM ARCHITECTURE AND METHODS OF DETERMINING DEVICE BEHAVIOR

(71) Applicant: Purdue Research Foundation, West Lafayette, IN (US)

(72) Inventors: Tillmann Christoph Kubis, West Lafayette, IN (US); Daniel Alberto Lemus, El Paso, TX (US); James Anthony Charles, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 384 days.

(21) Appl. No.: 16/829,809

(22) Filed: Mar. 25, 2020

(65) Prior Publication Data
US 2021/0304049 A1 Sep. 30, 2021

(51) Int. Cl.
*G06F 30/23* (2020.01)
*G06N 10/00* (2022.01)
*B82Y 10/00* (2011.01)

(52) U.S. Cl.
CPC .............. *G06F 30/23* (2020.01); *B82Y 10/00* (2013.01); *G06N 10/00* (2019.01)

(58) Field of Classification Search
CPC ....................................................... G06F 30/23
USPC ......................................................... 716/111
See application file for complete search history.

(56) References Cited

U.S. PATENT DOCUMENTS

2021/0103846 A1\* 4/2021 Gukelberger ........... G06T 17/20

\* cited by examiner

*Primary Examiner* — Eric D Lee
(74) *Attorney, Agent, or Firm* — Maginot, Moore & Beck LLP

(57) ABSTRACT

A method of determining a device behavior, wherein the method includes using a first procedure. The first procedure includes discretizing a user specified nano-device structure for at least one quantum method. Additionally, the first procedure includes solving the at least one quantum method, thereby having a solution of the at least one quantum method. Moreover, the first procedure includes extracting a parameter out of the solution of the at least one quantum method. Next, the first procedure includes applying at least one approximate method to the user-specified nano-device structure using the parameter. The first procedure additionally includes solving the at least one approximate method to the user-specified nano-device structure using the parameter. The first procedure also includes extracting the device behavior of the user-specified nano-device structure. Next, the method of determining the device behavior includes iterating the first procedure until a condition is satisfied.

18 Claims, 1 Drawing Sheet

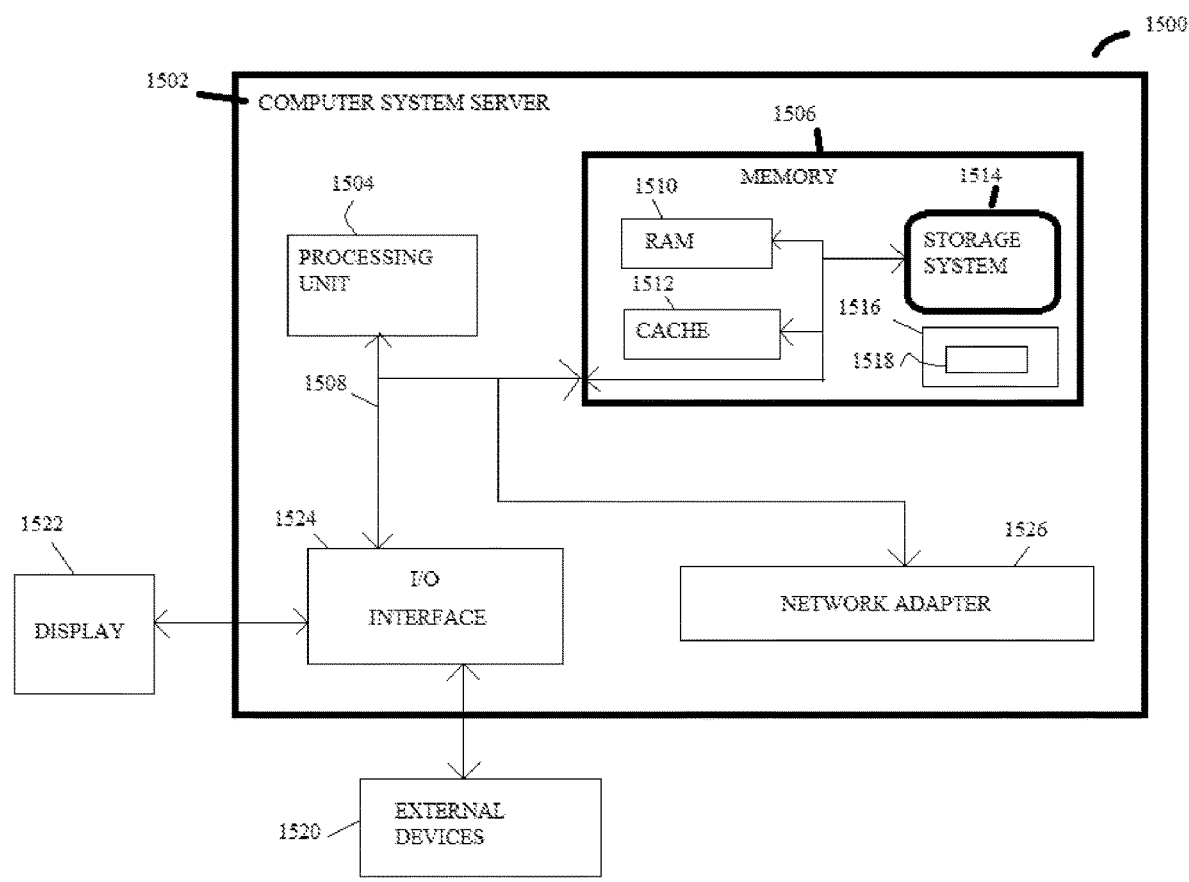

SYSTEM ARCHITECTURE AND METHODS OF DETERMINING DEVICE BEHAVIOR

BACKGROUND

This section introduces aspects that may help facilitate a better understanding of the disclosure. Accordingly, these statements are to be read in this light and are not to be understood as admissions about what is or is not prior art.

The computational capital needed to solve a quantum problem that's applicable to be used for modeling modern electronics is prohibitively expensive. Conventional numerical approximate methods for solving such problems, while efficient, require input parameters that can impact the accuracy.

SUMMARY

Various embodiments of the present application relate to solving such quantum problems that are applicable to be used in modeling modern electronics by having an iterative approach that uses parameters from the full scale conventional quantum methods for a particular device behavior into certain approximate methods that are determining the particular device behavior. Such embodiments are not only palatable for determining device behavior, but also save significant computational capital, and increase computing speed.

One aspect of the present application relates to a non-transitory computer-readable medium encoded with a computer readable program, which, when executed by a processor, will cause a computer to execute a method of determining a device behavior, wherein the method includes using a first procedure. The first procedure includes discretizing a user specified nano-device structure for at least one quantum method. Additionally, the first procedure includes solving the at least one quantum method, thereby having a solution of the at least one quantum method. Moreover, the first procedure includes extracting a parameter out of the solution of the at least one quantum method. Next, the first procedure includes applying at least one approximate method to the user-specified nano-device structure using the parameter. The first procedure additionally includes solving the at least one approximate method to the user-specified nano-device structure using the parameter. The first procedure also includes extracting the device behavior of the user-specified nano-device structure. Next, the method of determining the device behavior includes iterating the first procedure until a condition is satisfied. The condition comprises at least one of: a maximum number of user defined iterations, the parameter remains constant, a change in the parameter is smaller than a user specified limit, a change in the device behavior is smaller than the user specified limit, the parameter has reached a specific value, or the device behavior has reached a user specified characteristic.

Another aspect of the present application relates to a non-transitory computer-readable medium encoded with a computer readable program, which, when executed by a processor, will cause a computer to execute a method of determining a device behavior, wherein the method includes using a first procedure. The first procedure includes discretizing a user specified nano-device structure for at least one approximate method. Additionally, the first procedure includes assuming a parameter for input to the at least one approximate method. Moreover, the first procedure includes solving the at least one approximate method, thereby having a solution of the at least one approximate method. Next, the first procedure includes extracting the device behavior of the user-specified nano-device structure out of the solution of the at least one approximate method. The first procedure also includes discretizing the device behavior and the user-specified nanodevice structure for at least one quantum method. Further, the first procedure includes solving the at least one quantum method, thereby having a solution of the at least one quantum method. The first procedure additionally includes extracting a parameter out of the solution of the at least one quantum method. The method of determining the device behavior also includes iterating the first procedure until a condition is satisfied. The condition comprises at least one of: a maximum number of user defined iterations, the parameter remains constant, a change in the parameter is smaller than a user specified limit, a change in the device behavior is smaller than the user specified limit, the parameter has reached a specific value, or the device behavior has reached a user specified characteristic.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 1 illustrates one example of a computing or processing node 1500 for operating a method or a software architecture in accordance with the present application.

DETAILED DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Example 1: A non-transitory computer-readable medium encoded with a computer readable program, which, when executed by a processor, will cause a computer to execute a method of determining a device behavior, wherein the method includes using a first procedure. The first procedure includes discretizing a user specified nano-device structure for at least one quantum method. Additionally, the first procedure includes solving the at least one quantum method, thereby having a solution of the at least one quantum method. Moreover, the first procedure includes extracting a parameter out of the solution of the at least one quantum method. Next, the first procedure includes applying at least one approximate method to the user-specified nano-device structure using the parameter. The first procedure additionally includes solving the at least one approximate method to the user-specified nano-device structure using the parameter.

The first procedure also includes extracting the device behavior of the user-specified nano-device structure. Next, the method of determining the device behavior includes iterating the first procedure until a condition is satisfied. The condition comprises at least one of: a maximum number of user defined iterations, the parameter remains constant, a change in the parameter is smaller than a user specified limit, a change in the device behavior is smaller than the user specified limit, the parameter has reached a specific value, or the device behavior has reached a user specified characteristic.

In one or more embodiments, the discretizing the user specified nano-device structure for the at least one quantum method includes assuming a certain device behavior for the user specified nano-device structure.

In one or more embodiments, the discretizing the user specified nano-device structure for the at least one quantum method includes at least one of: using a finite differences discretization; using a finite element discretization; using an atomistic discretization; using a mode space discretization; using a momentum space discretization; using a real space discretization; using a envelope function discretization; using a effective mass discretization; using a k.p discretization; using a maximally localized Wannier function discretization; using a Wannier-Stark function discretization; using a Muffin-tin orbital discretization; using a plane-wave discretization; or using a linear combination of atomic orbital discretization.

In one or more embodiments, the user specified nano-device structure includes at least one of: logic nano-device, memory nano-device, nanosensor, optoelectronic nanodevice, light emitting diode, solar cell, hear sensor, thermoelectric nanodevice, Peltier element, power device, signal converter, or transistor.

In one or more embodiments, the at least one quantum method includes at least one of: a Schrödinger equation, a Dyson equation, a Keldysh equation, Kohn-Sham equations, Slater determinants, Wigner functions, Bloch equations, quantum transport methods and quantum property methods, a density matrix method, Liouville equations, Green-Kubo relations, or a von Neumann equation.

In one or more embodiments, the parameter includes at least one of: modes space functions, effective mass, band-structure properties, band gaps, mobility, carrier density, spin polarization, polarization, dielectric response, magnetic response, susceptibility, transmission, reflection, current density, heat density, heat current density, form factors, nonlocality of scattering, wave functions, or Hamiltonian elements.

In one or more embodiments, the at least one approximate method includes: a Boltzmann equation, a drift-diffusion equation, a quantum-corrected drift-diffusion equation, a semi-classical method, a Thomas-Fermi method, a Wentzel-Kramers-Brillouin method, an envelope function approximation, a low-rank approximation, or a Monte-Carlo method.

In one or more embodiments, the device behavior includes at least one of electrostatic potential, strain field, external fields, magnetic fields, magnetization, stress, doping profile, or atom/ion migration.

In one or more embodiments, the certain device behavior includes at least one of electrostatic potential, strain field, external fields, magnetic fields, magnetization, stress, doping profile, or atom/ion migration.

One of ordinary skilled in the art would recognize that the methodology described in the above example is programmed into a software architecture which is differentiated by various protocols, wherein each discretized protocol is configured to execute a different method.

Example 2: A non-transitory computer-readable medium encoded with a computer readable program, which, when executed by a processor, will cause a computer to execute a method of determining a device behavior, wherein the method includes using a first procedure. The first procedure includes discretizing a user specified nano-device structure for at least one approximate method. Additionally, the first procedure includes assuming a parameter for input to the at least one approximate method. Moreover, the first procedure includes solving the at least one approximate method, thereby having a solution of the at least one approximate method. Next, the first procedure includes extracting the device behavior of the user-specified nano-device structure out of the solution of the at least one approximate method. The first procedure also includes discretizing the device behavior and the user-specified nanodevice structure for at least one quantum method. Further, the first procedure includes solving the at least one quantum method, thereby having a solution of the at least one quantum method. The first procedure additionally includes extracting a parameter out of the solution of the at least one quantum method. The method of determining the device behavior also includes iterating the first procedure until a condition is satisfied. The condition comprises at least one of: a maximum number of user defined iterations, the parameter remains constant, a change in the parameter is smaller than a user specified limit, a change in the device behavior is smaller than the user specified limit, the parameter has reached a specific value, or the device behavior has reached a user specified characteristic.

In one or more embodiments, the discretizing the user specified nano-device structure for the at least one approximate method includes assuming a certain parameter for the user specified nano-device structure.

In one or more embodiments, the discretizing the user specified nano-device structure for the at least one approximate method includes at least one of using a finite differences discretization; using a finite element discretization; using an atomistic discretization; using a mode space discretization; using a momentum space discretization; using a real space discretization; using an envelope function discretization; using an effective mass discretization; using a k.p discretization; using a maximally localized Wannier function discretization; using a Wannier-Stark function discretization; using a Muffin-tin orbital discretization; using a plane-wave discretization; or using a linear combination of atomic orbital discretization.

In one or more embodiments, the user specified nano-device structure includes at least one of: logic nano-device, memory nano-device, nanosensor, optoelectronic nanodevice, light emitting diode, solar cell, hear sensor, thermoelectric nanodevice, Peltier element, power device, signal converter, or transistor.

In one or more embodiments, the at least one quantum method includes at least one of: a Schrödinger equation, a Dyson equation, a Keldysh equation, Kohn-Sham equations, Slater determinants, Wigner functions, Bloch equations, quantum transport methods and quantum property methods, a density matrix method, Liouville equations, Green-Kubo relations, or a von Neumann equation.

In one or more embodiments, the parameter includes at least one of: modes space functions, effective mass, band-structure properties, band gaps, mobility, carrier density, spin polarization, polarization, dielectric response, magnetic response, susceptibility, transmission, reflection, current density, heat density, heat current density, form factors, nonlocality of scattering, wave functions, or Hamiltonian elements.

In one or more embodiments, the at least one approximate method includes: a Boltzmann equation, a drift-diffusion equation, a quantum-corrected drift-diffusion equation, a semi-classical method, a Thomas-Fermi method, a Wentzel-Kramers-Brillouin method, an envelope function approximation, a low-rank approximation, or a Monte-Carlo method.

In one or more embodiments, the device behavior includes at least one of electrostatic potential, strain field, external fields, magnetic fields, magnetization, stress, doping profile, or atom/ion migration.

In one or more embodiments, the certain parameter includes at least one of: modes space functions, effective mass, bandstructure properties, band gaps, mobility, carrier density, spin polarization, polarization, dielectric response, magnetic response, susceptibility, transmission, reflection, current density, heat density, heat current density, form factors, nonlocality of scattering, wave functions, or Hamiltonian elements.

One of ordinary skilled in the art would recognize that the methodology described in the above example is programmed into a software architecture which is differentiated by various protocols, wherein each discretized protocol is configured to execute a different method.

As shown in FIG. 1, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory computer-readable medium encoded with a computer readable program, which, when executed by a processor, causes a computer to execute a method of determining a device behavior, wherein the method comprises:
    (A) using a first procedure, wherein the first procedure comprises:
        (i) discretizing a user specified nano-device structure for a full scale quantum method;
        (ii) solving the full scale quantum method, thereby having a solution of the full scale quantum method;
        (iii) extracting a parameter out of the solution of the full scale quantum method;
        (iv) applying an approximate method to the user-specified nano-device structure using the parameter;
        (v) solving the approximate method to the user-specified nano-device structure using the parameter; and
        (vi) extracting the device behavior of the user-specified nano-device structure; and
    (B) iterating the first procedure until a condition is satisfied,
    wherein the condition comprises at least one of: the parameter remains constant, a change in the parameter is smaller than a user specified limit, a change in the device behavior is smaller than the user specified limit, the parameter has reached a specific value, or the device behavior has reached a user specified characteristic, and
    wherein the approximate method includes different equations or methods than the full scale quantum method.

2. The non-transitory computer-readable medium of claim 1, wherein the discretizing the user specified nano-device structure for the full scale quantum method comprises:
    assuming a certain device behavior for the user specified nano-device structure.

3. The non-transitory computer-readable medium of claim 2, wherein the certain device behavior comprises at least one of electrostatic potential, strain field, external fields, magnetic fields, magnetization, stress, doping profile, or atom/ion migration.

4. The non-transitory computer-readable medium of claim 1, wherein the discretizing the user specified nano-device structure for the full scale quantum method comprises at least one of:
    using a finite differences discretization;
    using a finite element discretization;
    using an atomistic discretization;
    using a mode space discretization;
    using a momentum space discretization;
    using a real space discretization;
    using an envelope function discretization;
    using an effective mass discretization;
    using a k.p discretization;
    using a maximally localized Wannier function discretization;
    using a Wannier-Stark function discretization;
    using a Muffin-tin orbital discretization;
    using a plane-wave discretization; or
    using a linear combination of atomic orbital discretization.

5. The non-transitory computer-readable medium of claim 1, wherein the user specified nano-device structure comprises at least one of: logic nano-device, memory nano-device, nanosensor, optoelectronic nanodevice, light emitting diode, solar cell, hear sensor, thermoelectric nanodevice, Peltier element, power device, signal converter, or transistor.

6. The non-transitory computer-readable medium of claim 1, wherein the full scale quantum method comprises at least one of: a Schrödinger equation, a Dyson equation, a Keldysh equation, Kohn-Sham equations, Slater determinants, Wigner functions, Bloch equations, quantum transport methods and quantum property methods, a density matrix method, Liouville equations, Green-Kubo relations, or a von Neumann equation.

7. The non-transitory computer-readable medium of claim 1, wherein the parameter comprises at least one of: modes space functions, effective mass, bandstructure properties, band gaps, mobility, carrier density, spin polarization, polarization, dielectric response, magnetic response, susceptibility, transmission, reflection, current density, heat density, heat current density, form factors, nonlocality of scattering, wave functions, or Hamiltonian elements.

8. The non-transitory computer-readable medium of claim 1, wherein the approximate method comprises: a Boltzmann equation, a drift-diffusion equation, a quantum-corrected drift-diffusion equation, a semi-classical method, a Thomas-Fermi method, a Wentzel-Kramers-Brillouin method, an envelope function approximation, a low-rank approximation, or a Monte-Carlo method.

9. The non-transitory computer-readable medium of claim 1, wherein the device behavior comprises at least one of electrostatic potential, strain field, external fields, magnetic fields, magnetization, stress, doping profile, or atom/ion migration.

10. A non-transitory computer-readable medium encoded with a computer readable program, which, when executed by a processor, causes a computer to execute a method of determining a device behavior, wherein the method comprises:
    (A) using a first procedure, wherein the first procedure comprises:
        (i) discretizing a user specified nano-device structure for an approximate method;
        (ii) assuming a parameter for input to the approximate method;
        (iii) solving the approximate method, thereby having a solution of the approximate method;
        (iv) extracting the device behavior of the user-specified nano-device structure out of the solution of the approximate method;
        (v) discretizing the device behavior and the user-specified nano-device structure for a full scale quantum method;
        (vi) solving the full scale quantum method, thereby having a solution of the full scale quantum method; and
        (vii) extracting a parameter out of the solution of the full scale quantum method; and
    (B) iterating the first procedure until a condition is satisfied,
    wherein the condition comprises at least one of: the parameter remains constant, a change in the parameter is smaller than a user specified limit, a change in the device behavior is smaller than the user specified limit, the parameter has reached a specific value, or the device behavior has reached a user specified characteristic, and wherein the approximate method includes different equations or methods than the full scale quantum method.

11. The non-transitory computer-readable medium of claim 10, wherein the discretizing the user specified nano-device structure for the approximate method comprises:

assuming a certain parameter for the user specified nano-device structure.

12. The non-transitory computer-readable medium of claim 11, wherein the certain parameter comprises at least one of: modes space functions, effective mass, bandstructure properties, band gaps, mobility, carrier density, spin polarization, polarization, dielectric response, magnetic response, susceptibility, transmission, reflection, current density, heat density, heat current density, form factors, nonlocality of scattering, wave functions, or Hamiltonian elements.

13. The non-transitory computer-readable medium of claim 10, wherein the discretizing the user specified nano-device structure for the approximate method comprises at least one of:

using a finite differences discretization;
using a finite element discretization;
using an atomistic discretization;
using a mode space discretization;
using a momentum space discretization;
using a real space discretization;
using an envelope function discretization;
using an effective mass discretization;
using a k.p discretization;
using a maximally localized Wannier function discretization;
using a Wannier-Stark function discretization;
using a Muffin-tin orbital discretization;
using a plane-wave discretization; or
using a linear combination of atomic orbital discretization.

14. The non-transitory computer-readable medium of claim 10, wherein the user specified nano-device structure comprises at least one of: logic nano-device, memory nano-device, nanosensor, optoelectronic nanodevice, light emitting diode, solar cell, hear sensor, thermoelectric nanodevice, Peltier element, power device, signal converter, or transistor.

15. The non-transitory computer-readable medium of claim 10, wherein the full scale quantum method comprises at least one of: a Schrödinger equation, a Dyson equation, a Keldysh equation, Kohn-Sham equations, Slater determinants, Wigner functions, Bloch equations, quantum transport methods and quantum property methods, a density matrix method, Liouville equations, Green-Kubo relations, or a von Neumann equation.

16. The non-transitory computer-readable medium of claim 10, wherein the parameter comprises at least one of: modes space functions, effective mass, bandstructure properties, band gaps, mobility, carrier density, spin polarization, polarization, dielectric response, magnetic response, susceptibility, transmission, reflection, current density, heat density, heat current density, form factors, nonlocality of scattering, wave functions, or Hamiltonian elements.

17. The non-transitory computer-readable medium of claim 10, wherein the approximate method comprises: a Boltzmann equation, a drift-diffusion equation, a quantum-corrected drift-diffusion equation, a semi-classical method, a Thomas-Fermi method, a Wentzel-Kramers-Brillouin method, an envelope function approximation, a low-rank approximation, or a Monte-Carlo method.

18. The non-transitory computer-readable medium of claim 10, wherein the device behavior comprises at least one of electrostatic potential, strain field, external fields, magnetic fields, magnetization, stress, doping profile, or atom/ion migration.

* * * * *